June 20, 1961 R. H. SWART, JR 2,988,896
HEAT PUMP DEFROST CONTROL
Filed Feb. 1, 1957
2 Sheets-Sheet 1

*INVENTOR.*
RICHARD H. SWART, JR.
BY Herman Seid
ATTORNEY.

June 20, 1961 R. H. SWART, JR 2,988,896
HEAT PUMP DEFROST CONTROL
Filed Feb. 1, 1957 2 Sheets-Sheet 2
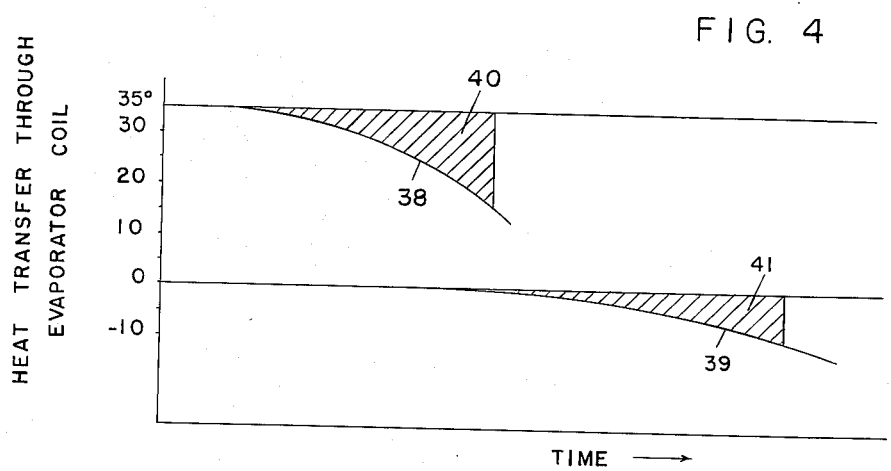
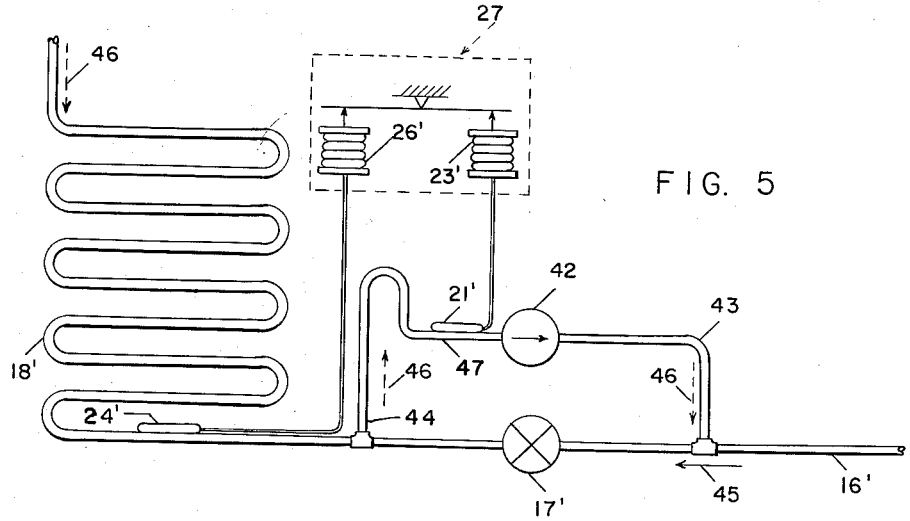
INVENTOR.
RICHARD H. SWART, JR.
BY
Herman Seid
ATTORNEY.

United States Patent Office 2,988,896
Patented June 20, 1961

2,988,896
HEAT PUMP DEFROST CONTROL
Richard H. Swart, Jr., Syracuse, N.Y., assignor to Carrier Corporation, Syracuse, N.Y., a corporation of Delaware
Filed Feb. 1, 1957, Ser. No. 637,740
5 Claims. (Cl. 62—156)

This invention relates to an improved control for and method of defrosting air conditioning apparatus which employs a refrigeration system which is operable on the reverse cycle principle to produce heat.

In the class of air conditioning apparatus which is operable under the reverse cycle principle to provide either cooling or heating, as desired, by selectively changing the path of flow of refrigerant through a portion of the refrigeration system, defrosting on the heating cycle has heretofore posed a problem. More specifically, when the air conditioning apparatus is used on the heating cycle, the heat exchange coil which is located out of doors and functions as an evaporator, often becomes coated with an insulating layer of frost which impedes the efficiency of the system by reducing the heat transfer characteristics of this coil. The rate of formation as well as the insulating characteristics of this undesirable frost is dependent on a combination of factors such as the temperature of the outside air, its humidity, and the temperature at which the evaporator coil is operating.

In the past, one of the methods of defrosting of the evaporator coil was by using a timing mechanism which periodically caused defrosting by re-routing the refrigerant through the circuit when a predetermined temperature was sensed by a thermostat at the evaporator coil. This method required costly timing equipment. Another method was by relying solely on thermostatic structure which would cause defrosting when the evaporator coil reached a predetermined temperature. The use of a thermostat in both instances was inefficient because an insulating layer of frost could be formed at a relatively high temperature at which the thermostat would not actuate the defrosting apparatus. On the other hand, when the outside air was relatively cold and dry, the defrosting cycle could be started by the thermostat responding to a low evaporator temperature at which there was very little or no frost on the evaporator coil, thus resulting in increased cost of operation of the apparatus because of the additional cost of performing unnecessary defrost cycles. Thus the previous modes of defrosting the evaporator coil of refrigeration apparatus operating as a heat pump which have relied on thermostats have had certain shortcomings since they did not actually compensate for all weather conditions under which the apparatus was operating.

In order to overcome certain disadvantages of defrost controls utilizing thermostats, a control which is responsive to an air pressure drop across the evaporator coil due to the build-up of frost thereon is also utilized. This device senses the increased air pressure drop across the coil as frost builds up thereon. When a predetermined pressure drop is sensed, the control will cause the defrost cycle to begin. However, this control is responsive to the accumulation of a predetermined thickness of frost on the coil. This causes it to be relatively inefficient and uneconomical in operation. More specifically, at low ambient temperatures it takes a longer time to accumulate a predetermined thickness of frost than at higher temperatures. This means that at lower air temperatures the evaporator will run for a longer period with frost on it before defrost is effected than at higher temperatures. Thus more electricity is consumed by the system when it operates with frost on it for long periods because the frost hinders efficient heat transfer. In other words, at lower operating temperatures there will be larger-than-desirable consumption of electricity for a relatively long period of time before defrost is effected. On the other hand, if the foregoing pressure-drop defrost control is calibrated to operate efficiently at low temperatures, that is, when there was a small accumulation of frost on the evaporator coil, it would be defrosting too often at higher temperatures. This is uneconomical because the savings realized by the increased efficiency of a refrigeration system which is defrosted often is more than offset by the cost of the additional electricity consumed by causing frequent defrost, as explained hereafter.

It is equally necessary to obtain maximum heating output as well as efficiency under the above conditions of controlled frost formation. It is therefore one object to provide defrosting control for a heat pump which regulates the thickness of frost build-up on the outside ambient heat exchanger as required for maximum heating output and for most economical power input.

It is another object of this invention to provide a defrost control for a heat pump which takes into account the weather conditions under which the apparatus is operating and causes defrosting only when it is most economically desirable.

Another object of this invention is to provide a defrost control for a heat pump in which the amount of frost on the apparatus which will cause defrost varies with the outdoor temperature and humidity.

Another object is to provide a defrost control for a heat pump in which the amount of frost on the apparatus which will cause defrost is dependent on the physical characteristics such as the relative insulating value of an icy or frost coating.

It is still another object of this invention to provide a defrost control for a heat pump which provides a maximum of heat output and which utilizes relatively few and inexpensive components.

Another object is to provide a control system which senses the ideal temperature difference between the outside ambient air and the heat exchanger surface as related to both the length of running cycles and to the amount of frost build-up which can be tolerated before defrost is desirable.

A further object of this invention is to provide a defrost control for a heat pump which will cause defrosting only when it is needed and thus reduce the operating expense of the apparatus. In this respect, the defrost control will prevent an excessive accumulation of insulating frost which reduces the efficiency of the apparatus.

Another object is to prevent the apparatus from going on to its defrost cycle prematurely, thus preventing the wasting of electrical power. Other objects and attendant advantages of the present invention will become readily apparent hereafter.

The defrost control of the present invention in achieving the foregoing objects overcomes the above-described shortcomings of the prior art. Because of its construction, the defrost control causes defrosting of the apparatus only when it is more economical to cause defrosting than to continue running the apparatus in its frosted condition. In other words, it inherently balances the cost of defrosting against the amount it costs to run the apparatus in a frosted condition, and when it is more economical to cause defrost rather than to continue running the apparatus in a frosted condition, defrost is effected. The foregoing is accomplished by taking into account the fact that it takes longer for frost to form at lower temperatures than at higher temperatures. The structure of the present invention therefore inherently provides for longer time intervals between defrost at lower temperatures, but it does not allow the frost to build up to as great an extent at lower temperatures. Defrost will be effected at any given ambient temperature whenever there is a predetermined corresponding temperature drop of the evaporator from its non-frosted saturated suction temperature, the amount of this drop which will cause defrost being less at lower temperatures but allowing longer periods and less frost accumulation between defrost cycles at these lower temperatures.

The defrost control of the present invention causes a refrigeration system operating as a heat pump to defrost by reversing the flow of refrigerant therein when there is an accumulation of frost on the evaporator coil, as measured by a comparison of the evaporator temperature with the ambient temperature. The frost thickness at which defrost is effected varies directly with the ambient temperature. A first bulb which is partially filled with a liquid is placed in the ambient. The ratio of liquid to gas existing within the bulb is dependent on the ambient temperature. A second bulb, which is also partially filled with liquid, is placed in contact with the evaporator coil which must be periodically defrosted. An expandible diaphragm or bellows is associated with each of the bulbs to tend to cause motion dependent on the saturation pressure of the fluid within the bulbs. Both of the bellows act in opposition to each other on a linkage. Regardless of the ambient temperature, the net difference in force produced by the fluids in each of the bellows will exceed a certain minimum value in the absence of frost on the evaporator coil, and there will be no actuation of the linkage. However, regardless of the ambient temperature, if frost should form on the evaporator coil, the temperature of the liquid in the evaporator bulb will become lower than if there were no frost on the evaporator. This will cause the saturation pressure in the evaporator bulb to decrease. On the other hand, the saturation pressure within the ambient bulb still continues to exert a given force on its diaphragm. Thus there will be a different net force exerted by the diaphragms on the linkage. When the net force reaches a predetermined value, the linkage will actuate a switch to cause a reversal of refrigerant flow through the refrigeration circuit to cause the evaporator to become heated by hot refrigerant. Since frost builds up more slowly at lower temperatures, longer time intervals will elapse for each degree of temperature drop of the evaporator coil at these lower temperatures. However, the control is so constructed that the number of degrees of temperature drop which will cause defrost at lower temperatures is less than that required at higher temperatures. The control structure inherently takes into consideration the ambient temperature to cause defrost at lower temperatures to occur after longer periods of heat pump operation during which there is less of an accumulation of frost than is experienced at higher temperatures. When the reversing of the refrigerant cycle is initiated, a heater element is energized to heat the ambient bulb to cause the fluid therein to change completely to a gas and remain under relatively high pressure until such time that the evaporator bulb has been heated sufficiently by the hot gases passing through the outdoor heat exchanger (which is now functioning as a condenser) so that the force exerted by the evaporator bulb diaphragm overcomes the force exerted by the ambient bulb diaphragm and causes the linkage to actuate the switch which causes the apparatus to return to a heating cycle. When this occurs, the heater element is deenergized. The defrosting will occur only when there is a predetermined relationship between the thickness of the insulating layer of frost on the evaporator coil and the ambient temperature, less frost thickness causing defrost at lower temperatures. The present invention will be more fully understood when the following portion of the specification is read in conjunction with the accompanying drawings wherein:

FIGURE 1 schematically depicts the defrost control of the present invention in relation to a refrigeration system which is operable on a reverse cycle;

FIGURE 4 is a graph which depicts the progressive drop in heat transfer through the evaporator of a heat pump as it becomes frosted at various evaporator temperatures as a function of time; and FIGURE 5 shows a modified portion of the defrost control of FIGURE 1.

Figure 1:
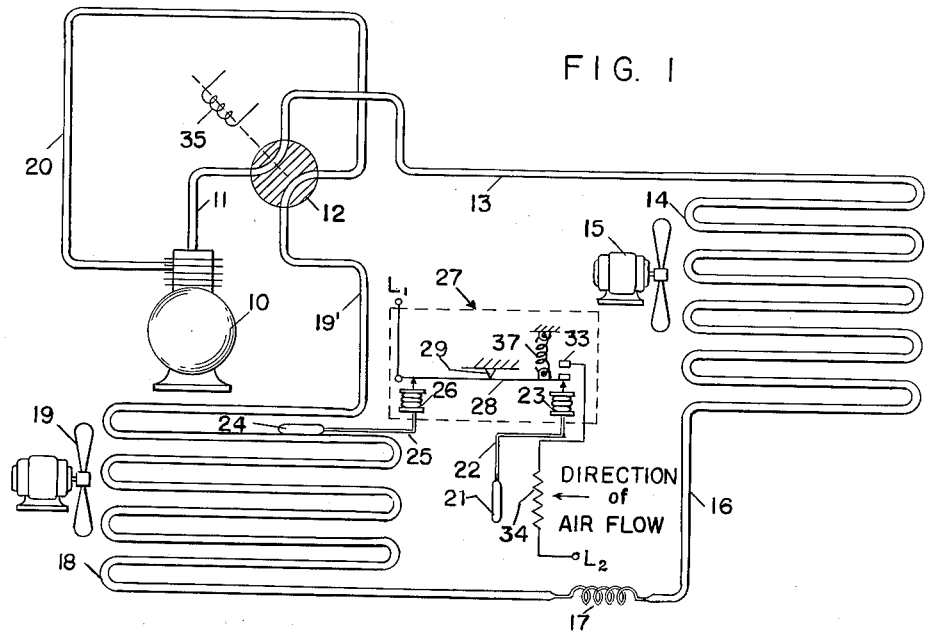

In FIGURE 1 a reverse cycle refrigeration system is shown for selectively cooling or heating air. During the heating cycle, a compressor 10 compresses a suitable refrigerant and forwards it through line 11, valve 12 and line 13 to a condensing coil 14 which is adapted to heat air which is forced over it by fan 15. The refrigerant then passes through line 16 and expansion device 17 to evaporator coil 18 where the refrigerant is evaporated as it absorbs heat from the atmosphere. Coil 14 is located within the enclosure which is to be heated and coil 18 is positioned in a location from which heat is to be absorbed, usually out of doors. A fan 19 induces air through the evaporator coil 18. The refrigerant passes from coil 18 through line 19', valve 12 and line 20 to the inlet side of compressor 10. It will readily be appreciated that if it is desired to use the refrigeration system for cooling air, valve 12 is manipulated to cause the refrigerant flow to be reversed in the conventional manner so that coil 14 functions as an evaporator and coil 18 functions as a condenser.

As noted above, during the heating cycle, coil 18, which is located out of doors, may become coated with an insulating layer of frost which impedes the heat transfer characteristics thereof and reduces the efficiency of the system. The temperature at which this frost is encountered depends on the ambient air temperature, its humidity, and the operating temperature of the evaporator coil 18. It is desirable to defrost coil 18 whenever the thickness of frost which accumulates thereon reaches a certain value, this desirable value varying with the temperature. More specifically, at lower temperatures it is desirable to defrost when there is less frost than there is at higher temperatures, as explained in detail hereafter. However, at these lower temperatures it is desirable to defrost less frequently than at higher temperatures.

The defrost control consists of a bulb 21 which is located in the ambient. Bulb 21 is partially filled with a fluid, such as sulphur dioxide, which will change state with changes in temperature. The saturation presure within bulb 21 depends on the ambient temperature. A line 22 connects bulb 21 to an expandable diaphragm, such as bellows 23. Bulb 21, line 22 and bellows 23 form a closed circuit. Thus, depending on the saturation pressure of the fluid within bulb 21, as determined by the ambient temperature, bellows 23 will either be in an expanded or contracted condition. A second bulb 24, which is partially filled with a liquid, such as the azeotrope of dichlorodifluoromethane and unsymmetrical difluoroethane is positioned on evaporator coil 18 for sensing its temperature. The saturation pressure within bulb 24 depends on the evaporator temperature. Bulb 24 is connected by line 25 to a diaphragm, such as bellows 26, to form a completely closed circuit for the fluid. It can therefore be seen that bellows 26 will either expand or contract with changes in temperature of the evaporator coil 18.

Bellows 23 and 26 are associated with a force responsive switch 27. For ease of explanation, switch 27 is depicted schematically as a first class lever consisting of the lever arm 28 mounted on a fulcrum 29, it being readily appreciated that it can take any other necessary form which will accomplish the intended purpose, as described in detail hereafter. As can be seen from FIGURE 1, bellows 23 bears on one end of lever arm 28, and bellows 26 bears on the other end thereof. Thus the bellows are acting against each other.

In FIGURE 4, curves 38 and 39 depict the progressive loss of heat transfer through the evaporator coil as frost builds up thereon as a function of time at 35° F. and 0° F. ambient, respectively. As there is a loss in heat transfer, there is a corresponding increase in the amount of electricity used to obtain a given amount of heating. This additional amount of electricity times the length of time which it is used is the power loss of the system due to frosting, and is proportional to the shaded portions 40 and 41 for curves 38 and 39, respectively. Since curve 39 is of lesser slope than curve 38, it can readily be seen that it will take a longer time to obtain the area 41 than the area 40, these areas being of equal magnitude. In other words, at lower temperatures it will take a longer time to realize a given power loss than at higher temperatures.

Depending on the characteristics of the refrigeration system, it costs a certain amount to effect defrost. This can be computed, for example, by considering the cost of additional power required for running the compressor of the refrigeration system during the defrosting operation, plus the cost of electrical power required to produce sufficient heat to overcome the cooling of an enclosure produced by the heat exchange coil which is located within the enclosure to be heated when it functions as an evaporator during the defrosting operation, plus the cost of the additional electrical power required to cool the outdoor coil which was heated during defrost and to heat the indoor coil which was cooled during defrost. When the foregoing cost of operating the apparatus on the heating cycle in a frosted condition becomes equal to the cost of defrost, it becomes economically feasible to effect defrost of the evaporator or outdoor coil because permitting the evaporator to operate in the frosted condition would then cost more than the cost of defrosting. It can thus be seen that the total number of defrost cycles which are effected during a period of time should be less when the heat pump is operating at lower temperatures than when it is operating at higher temperatures. Thus the total cost of defrosting over a period of time is varied in accordance with changing conditions under which the heat pump operates, the frequency of defrost being diminished as required in order to give the most economical operation.

As can readily be seen from FIGURE 4, the length of time required for the same loss of power to be realized as the evaporator coil frosts varies inversely with the outdoor temperature at which the refrigeration system is operating, these costs being proportional to areas 40 and 41. On the other hand, the cost of defrosting the evaporator coil can be considered substantially constant regardless of the outdoor temperature. When the area 40 or 41 reaches the value that it is equal to the cost of defrosting, it becomes economical to effect defrost because permitting the frosting to continue beyond this point would result in a greater power cost than the cost of the amount of electricity required to effect defrost at this point. Conversely, if defrost should be effected prior to this time for any given temperature, it would cost more to defrost the evaporator coil than the cost of running it in the frosted condition. The present defrost control inherently takes the foregoing into consideration and causes defrost when it is most economically feasible based on the actual thickness of the frost as determined from a comparison of the evaporator temperature with the ambient temperature. Not only is the economy of operation dependent upon proper control of defrost, but an equally important consideration is that of heating capacity. It is well known in the art that the total heat output to the occupied space is a funcion of the temperature of the outdoor exchanger, the lower his temperature the lower the quantity of heat produced, as this is dependent upon the density of the suction vapor to the compressor.

Figure 3:
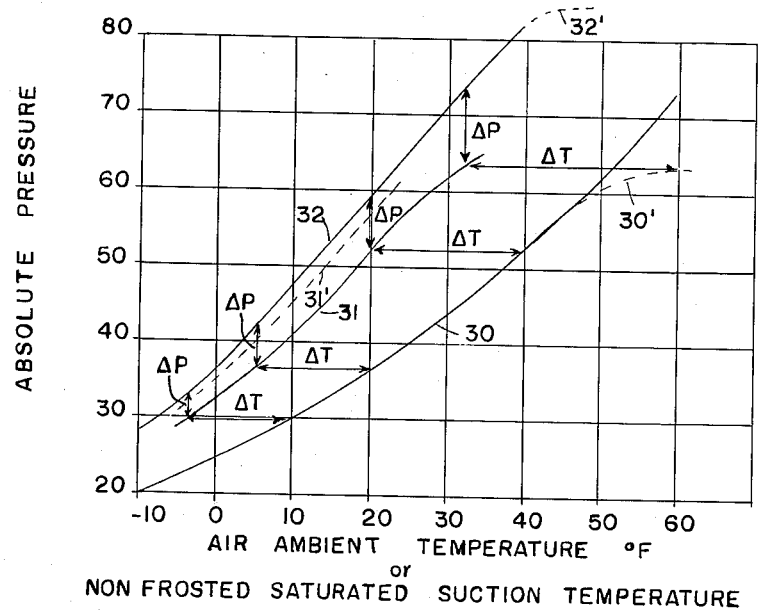
FIGURE 3 is a graph which indicates the mode of operation of the defrost control.

Before proceeding with a further description of the remainder of the defrost control structure and its actual mode of operation, the theory of operation by which the foregoing results are obtained will be axplained, attention being directed to FIGURE 3. Curve 30 depicts the saturation pressure within bulb 21 for any given ambient temperature. Curve 31 depicts the temperature at which a non-frosted evaporator coil 18 will operate for any given ambient temperature shown on curve 30 if the heat pump is operating at its saturated suction temperature. $\Delta T$ is the difference between a given ambient temperature and the saturated suction temperature of a non-frosted evaporator. It is to be noted that $\Delta T$ varies depending on the ambient temperature. Curve 31 has no pressure significance. Curve 32 depicts the saturation pressure within bulb 24 for any given evaporator temperature, it being appreciated that the temperature of the bulb 24 and evaporator coil 18 are substantially the same. Thus, using curve 31 as a reference it can readily be seen that for any given non-frosted evaporator saturation suction temperature, the difference in saturation pressures between the bulbs 21 and 24 is $\Delta P$. It can further be seen from FIGURE 3 that the difference in pressure, $\Delta P$ between bulbs 21 and 24 changes throughout the range of operation of an unfrosted evaporator coil 18 operating at its saturated suction pressure from a temperature of approximately $-4°$ F. to $+32°$ F. More specifically, as the operating temperature of coil 18 decreases, the pressure difference, $\Delta P$, between the fluids in bulbs 21 and 24 will decrease.

It is to be noted that the present description uses the terms pressure and force interchangeably when referring to the operation of bellows 23 and 26 since it is considered that the effective bellows aeas upon which the fluids in bulbs 21 and 24 act are equal. However, it is to be understood that it is actually the resultant forces exerted on lever arm 28 by both bellows 23 and 26 which cause the device to operate properly.

As long as the evaporator coil 18 remains unfrosted, the various differences in force exerted by bellows 23 and 26 on lever arm 28 produced by the difference in pressure $\Delta P$ will be insufficient to initiate the defrost cycle. In this respect, it is noted that the force exerted by bellows 26 is greater than the force exerted by bellows 23. If this inequality of forces were not compensated for, lever arm 28 would always be rotating clockwise. A spring 37 is therefore affixed to lever arm 28 so as to balance the net difference in force between bellows 26 and 23 to cause lever arm 28 to remain stationary when the refrigeration system is operating on the heating cycle. However, when the evaporator coil 18 begins to collect frost, the evaporator 18 will operate at a lower temperature than its saturated suction temperature for any given ambient temperature. Thus curve 31 will move to the left in FIGURE 3 so as to approach curve 32. When this occurs to a predetermined extent, $\Delta P$, the difference in pressure between the bulbs will decrease, that is, the ratio between the pressure in bulb 21 to the pressure in bulb 24 will increase. This can also be seen by considering that as the evaporator coil 18 temperature decreases due to the formation of frost, the quantity of the liquid in bulb 24 will increase and the density of gas will decrease and thus exert less pressure through bellows 26 while the pressure due to the fluid in bulb 21 will remain constant and exert the same amount of pressure through bellows 23. When this occurs, bellows 23, by exerting the same force on lever 28 while bellows 26 exerts a lesser force, will cause lever 28 to rotate counterclockwise. When the frost has accumulated to the required extent on evaporator coil 18 so as to cause $\Delta P$ to diminish to a required extent, the defrost cycle will be initiated.

As noted above, it is only when the combined force produced by bellows 23 and spring 37 exceeds the force produced by bellows 26 by a sufficient amount to cause lever arm 28 to rotate counterclockwise, that defrost will be effected. Therefore the system is calibrated by making the force differential which will cause defrost smaller than that which corresponds to the smallest possible value of ΔP existing between curves 31 and 32, that is, when curve 31 shifts over to the dotted line position 31' so that the pressure differential between bulbs 21 and 24 is between curve 31' and curve 32 for any given ambient temperature. However, it takes a longer time for a small change in ΔP to occur at lower ambient temperatures than for a larger change at higher ambient temperatures because frost accumulates at a lower rate at these lower temperatures, as can be seen from FIGURE 4. The parameters of the system are such that they will tend to follow the areas of FIGURE 4, that is, defrost will be caused to occur a shorter time after the system has been placed in operation at higher ambient temperatures than at lower ambient temperatures. In other words, the ultimate result achieved by the defrost control is that it causes defrost at a time that the system would use more power if it continued to operate in a frosted condition than it would during defrost at any temperature at which the system is operating.

Figure 2:
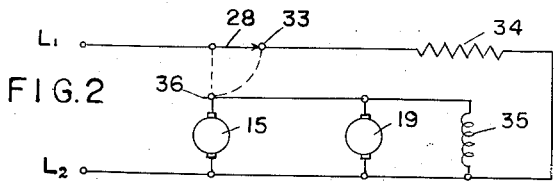
FIGURE 2 is a schematic wiring diagram of the electrical circuit employed with the defrost control of FIGURE 1.

Defrost is actually accomplished in the following manner: Once the difference in forces exerted between bellows 23 and 26 has caused lever 28 to swing in a counter-clockwise direction, arm 28 will contact terminal 33 to complete an electrical path from flexible lead line L₁ through lever 28, terminal 33 and heating element 34 to line L₂ (FIGURES 1 and 2). When the foregoing occurs, it can readily be seen from FIGURE 2 that the flow of current through condenser fan motor 15, evaporator fan motor 19, and reversing valve solenoid coil 35 is disrupted. The deenergizing of reversing valve solenoid coil 35 will cause valve 12 to assume a position which will cause the refrigerant flow in the circuit to be reversed so that frosted coil 18 will function as a condenser and coil 14 will function as an evaporator. The hot gas coming from compressor 10 will cause the frost on coil 18 to melt. It is also to be noted that the fans 15 and 19 are inoperative during defrost. If fan 19 was operating it would blow cold air over coil 18 which is being defrosted and thus tend to oppose the defrosting operation. Also, if fan 15 were operating, it would cause air to pass over coil 14 which is now functioning as an evaporator and is located within the enclosure to be heated. Thus, since the operation of fan 15 would blow cold air into a room which should be heated, it is desirable to shut fan 15 off during defrost.

As noted above, as soon as the defrost cycle begins, heating element 34 is energized to heat ambient bulb 21. As the bulb 21 is heated, the liquid therein is turned to vapor which exerts a higher pressure within bellows 23 than was exerted at the initiation of the defrost cycle. This action tends to maintain the lever arm 28 in a defrost position against the increasing force produced by bellows 26 as the vapor pressure in bulb 24 increases due to the warming of coil 18 during defrost. As the liquid within bulb 24 is progressively heated during defrost, it will continue to exert greater pressure thus tending to rotate lever arm 28 clockwise to terminate the defrost operation. When the defrosting of coil 18 is complete, the pressure in bulb 24 will have increased sufficiently to cause the lever arm 28 to be rotated clockwise against the force exerted by bellows 23 and spring 37. Bellows 23 will yield to the force exerted by bellows 26 because the movement of the latter will cause the gas in the former to compress. As the lever arm 28 moves clockwise, contact between this arm and terminal 33 will be broken. As can be seen from FIGURE 2, heating element 34 will be deenergized and arm 28 will contact terminal 36 to provide current to fans 15 and 19, and valve solenoid 35. The energization of the solenoid 35 will cause valve 12 to revert to the position shown in FIGURE 1 to start the refrigeration circuit operating on the heating cycle. As can be seen from FIGURE 1, since the flow of cold air is in the direction of the arrow, heating element 34 and bulb 21 will be cooled to the ambient temperature in a relatively short time. When bulb 24 is cooled to the temperature of coil 18, the defrost control will be in equilibrium and this condition will be maintained until such time that conditions indicate that the defrost cycle should be repeated.

Under ordinary operating conditions, when the heating cycle is resumed, the flow of cold air will cause bulb 21 to cool faster than bulb 24 so that a larger force will be produced by bellows 26 on lever arm 28 than is produced by bellows 23. This will tend to maintain the system on the heating cycle until defrost is again required. If, however, bulb 24 should cool faster than bulb 21 during this transition period, the defrost cycle could be initiated prematurely. Therefore, a modified construction is shown in FIGURE 5 which provides positive cooling to the ambient bulb, that is, ambient air is not relied on to cool the bulb. In addition, this alternate construction eliminates the need for an electrical heating element 34, such as shown in FIGURE 1.

The construction of FIGURE 5 may be used with a heat pump system such as shown in the copending application of Edward J. Burke, Serial No. 625,889, filed December 3, 1956 now issued as United States Letters Patent 2,934,323, wherein two expansion valves are used and a by-pass valve is used with each valve. During the heating cycle, refrigerant passes through expansion valve 17' in the direction of arrow 45 to evaporator coil 18' because valve 42 prevents the refrigerant from by-passing valve 17', as is well known in the art. Thus since there is no refrigerant passing through valve 42 or through pipes 43 and 44 which communicate with the main refrigerant line 16', ambient bulb 21' will sense the ambient temperature, providing it is above conduit 45. Evaporator bulb 24' is attached to evaporator coil 18' to sense the temperature of the latter. Thus during the heating cycle the same relationship exists between bulbs 21' and 24' as does between bulbs 21 and 24 of FIGURE 1.

When defrost is initiated, it is desirable to heat ambient bulb 21' for the same reasons described above relative to bulb 21 of FIGURE 1. During defrost, coil 18' functions as a condenser and the direction of flow of refrigerant is indicated by arrows 46. Thus the hot gases will flow from coil 18', via line 44, valve 42, and line 43 to conduit 16'. Bulb 21' will thus be heated by the hot gases in conduit 44 which will cause bulb 21' to function in the same manner described above relative to bulb 21 of FIGURE 1 to perpetuate the defrost operation. In other words, the hot gases in pipe 44 will serve the same function as heating element 34 of FIGURE 1.

Once the defrost cycle has terminated in the same manner described above relative to FIGURE 1, that is when bulb 24' builds up sufficient pressure to cause the bellows 26' attached thereto to exert a greater force than the bellows 23' associated with bulb 21', the flow of refrigerant will again be in the direction of arrow 45 and coil 18' will function as an evaporator. Pipe 44 is so bent as to form a liquid trap 47 in the area adjacent to bulb 21'. Thus there will be an amount of liquid refrigerant trapped in area 47 when the flow of refrigerant is reversed. As the suction pressure in coil 18' decreases, the liquid in trapped area 47 will expand. In so doing it will positively cool the trap 47 and bulb 21' affixed thereto. In this manner positive cooling of bulb 21' is assured to prevent the refrigeration system from being prematurely defrosted by improper operation of the defrost control, as described in detail above.

It is to be noted from FIGURE 3, that the defrost control of the present invention positively prevents the placing of the heat pump on a defrost cycle when there is no need for defrost, that is, when the actual temperature of the evaporator coil 18 (as shown on curve 31) is above 32° F. and the moisture thereon is therefore in the liquid state. From FIGURE 3, it can be seen that when curve 31 indicates a saturated suction evaporator temperature of 32° F. the ambient temperature on curve 30 is approximately 52° F. However, the liquid in partially-filled bulb 21 is adapted to be formed entirely into a gas immediately prior to the reaching of a temperature of 52° F. Thus the gas within bellows 23 will cause no additional force on lever arm 28 to tend to cause the defrost cycle to be initiated as the ambient temperature rises above 52° F. because the tendency for counterclockwise motion will be opposed by the pressure exerted by the fill within bellows 26. In other words, before an ambient temperature of 52° F. is reached, the pressure within bellows 23 will tend to "fade out," that is, it will tend to stop increasing with increases in temperature, as indicated by the dotted line portion 30' of curve 30. It is also to be noted that ΔP at a saturated evaporator temperature of 32° F. (on curve 31) is only slightly higher than it is for lower saturated suction pressures of a dry evaporator coil. It can additionally be seen that as the ambient temperature increases above 52° F. ΔP will tend to increase. Since the defrost control will only cause defrosting of the evaporator 18 when ΔP decreases, it can be seen that the increase in ΔP above an ambient 52° F. tends to oppose rather than cause defrost. It is, of course, to be understood that by varying the type of fill within bulb 21, the characteristics of curve 30 may be varied, and by varying the amount of fill "fade-out" may be caused to occur at different ambient temperatures. Furthermore, by mixing various refrigerants within the bulbs, curves 30 and 32 may have their characteristics varied to meet any specific application.

The foregoing description related to the operation of the refrigeration system on the heating cycle. However, as noted above the refrigeration system is also operable to provide cooling to an enclosure when indoor coil 14 functions as an evaporator and outdoor coil 18 functions as a condenser, as is well known in the art. When coil 18 is functioning as a condenser its temperature will be high and bulb 24 associated therewith will be hot, thus tending to cause bellows 26 to expand. Therefore the amount of fill within bulb 24 is kept at such a value that "fade-out" of the pressure therein will occur, as depicted by extension 32' of curve 32, at a pressure which is low enough so that the bursting of bellows 26 or injury to switch 27 will be avoided.

Thus it can be seen that the defrost control of the present invention is operable to efficiently defrost an evaporator coil of a heat pump as required solely in response to the accumulation of a varying amount of frost thereon depending on the ambient temperature.

While I have described a preferred embodiment of the invention, it will be understood that the invention is not limited thereto since it may be otherwise embodied within the scope of the following claims.

I claim:

1. Air conditioning apparatus of the type including a refrigeration system operable to selectively heat or cool air comprising a compressor having an inlet and an outlet, first and second heat exchange coils normally coupled to said compressor inlet and outlet, respectively, when said apparatus is used for heating, expansion means coupling said coils to each other, valve means coupled between said coils and said compressor for selectively causing said first and second coils to be coupled to said compressor outlet and inlet, respectively, in order to effect defrost of said second coil and defrost control mechanism effective to prevent premature termination of defrost and comprising a first thermal responsive system containing a temperature responsive fluid medium for producing a variable pressure representing a force within said system, said system sensing the temperature of the second coil, a second thermal responsive system containing a temperature responsive fluid medium different from said first fluid medium for producing a variable pressure representing a force within said system, said second system sensing the temperature of the air passing over said coil, the force created by expansion of fluid within the first system acting in opposition to the force created by expansion of fluid within the second system and the rate of variation between the force and temperature in the first system being different from the rate of variation between the force and temperature in the second system so that a predetermined force differential within the two systems is substantially independent of a fixed temperature difference between the coil and the air and means responsive to a predetermined force differential as measured by said systems for actuating the valve means to initiate defrost of said second coil.

2. The invention set forth in claim 1 wherein said mechanism includes a heater for elevating the temperature of the second system during defrost action.

3. The invention set forth in claim 2 wherein said mechanism includes a portion of a line, connecting the end of the coil and the first coil, subject to an elevated temperature during the defrost action.

4. The invention set forth in claim 3 wherein said mechanism includes a looped section of the portion of the line for assuring presence in the line of a supply of warm refrigerant sufficient to maintain said second system heated during defrost action.

5. Air conditioning apparatus including a refrigeration system comprising a compressor, a first heat transfer coil, a second heat transfer coil, expansion means coupling said heat transfer coils to form a refrigerant flow circuit, means for supplying a stream of air acros one of said heat transfer coils to extract heat from the air, the surface of said coil having accumulated thereon a coating of frost under certain predetermined system operating conditions, means effective to remove the coating of frost, said means including defrost control mechanism effective to prevent premature termination of defrost and comprising a first thermal responsive system containing a temperature responsive fluid medium for producing a variable pressure representing a force within said system, said system sensing the temperature of the frosted coil, a second thermal responsive system containing a temperature responsive fluid medium different from said first fluid medium for producing a variable pressure representing a force within said system, said second system sensing the temperature of the air passing over said frost coil, the force created by expansion of fluid within the first system acting in opposition to the force created by expansion of fluid within the second system and the rate of variation between the force and temperature in the first system being different from the rate of variation between the force and temperature in the second system so that a predetermined force differential within the two systems is substantially independent of a fixed temperature difference between the coil and the air and means responsive to a predetermined force differential as measured by said systems to initiate defrost of said coil.

References Cited in the file of this patent

UNITED STATES PATENTS

| 2,531,136 | Kurtz | Nov. 21, 1950 |
| 2,666,298 | Jones | Jan. 19, 1954 |

OTHER REFERENCES

Air Conditioning and Refrigeration News, page 26, January 4, 1954.

UNITED STATES PATENT OFFICE
CERTIFICATE OF CORRECTION

Patent No. 2,988,896                      June 20, 1961

Richard H. Swart, Jr.

It is hereby certified that error appears in the above numbered patent requiring correction and that the said Letters Patent should read as corrected below.

Column 4, line 47, for "particully" read -- partially --; line 49, for "presure" read -- pressure --; column 5, line 73, for "his" read -- this --; column 6, line 4, for "axplained" read -- explained --; line 34, for "aeas" read -- areas --; column 10, line 35, for "acros" read -- across --.

Signed and sealed this 5th day of December 1961.

(SEAL)
Attest:

ERNEST W. SWIDER
Attesting Officer

DAVID L. LADD
Commissioner of Patents
USCOMM-DC